United States Patent [19]
Andersson

[11] Patent Number: 6,111,537
[45] Date of Patent: Aug. 29, 2000

[54] METHOD FOR REDUCING FALSE TARGET ECHO INDICATIONS

[75] Inventor: Bengt Andersson, Kullavik, Sweden

[73] Assignee: Telefonaktiebolaget LM Ericsson, Stockholm, Sweden

[21] Appl. No.: 09/267,381

[22] Filed: Mar. 15, 1999

[30] Foreign Application Priority Data

Mar. 16, 1998 [SE] Sweden .................................. 9800847

[51] Int. Cl.$^7$ .............................. G01S 7/28; G01S 13/12; G01S 13/18
[52] U.S. Cl. .......................... 342/137; 342/118; 342/134; 342/136; 342/159; 342/195
[58] Field of Search .................................. 342/118, 134, 342/135, 136, 137, 116, 159–164, 175, 195

[56] References Cited

U.S. PATENT DOCUMENTS

| 4,015,261 | 3/1977 | Campbell ............................ 342/137 X |
| 4,057,800 | 11/1977 | Ganz ....................................... 342/116 |
| 4,106,019 | 8/1978 | Alexander et al. . |
| 4,584,579 | 4/1986 | Frost et al. . |
| 4,642,641 | 2/1987 | Campbell ............................ 342/137 X |
| 4,816,833 | 3/1989 | Ferguson et al. . |
| 4,954,830 | 9/1990 | Krikorian et al. . |

*Primary Examiner*—Bernarr E. Gregory
*Attorney, Agent, or Firm*—Burns, Doane, Swecker & Mathis, L.L.P.

[57] ABSTRACT

Method for reducing false target echo indications in a pulse Doppler radar having at least two different pulse repetition frequencies during the period in which the main beam of the radar illuminates a target. A target which is detected gives rise to a number of primary detections in each PRF. The method includes use of at least one variable criterion and a final criterion, which are both of the M/N type. The factor M in the variable criterion is initially greater than the factor M in the final criterion. The method also includes the feature that primary detections which are all to be found in the same range gate in a number of PRF's, which number is equal to the factor M in the variable criterion, are approved as targets in this range gate. If the factor M in the variable criterion and the final criterion are not equal, the approved primary detections and all other primary detections corresponding thereto, are removed from further processing, and if the factor M in the variable and the other criterion are not equal, a predetermined number is subtracted from the factor M in the variable criterion.

8 Claims, 4 Drawing Sheets

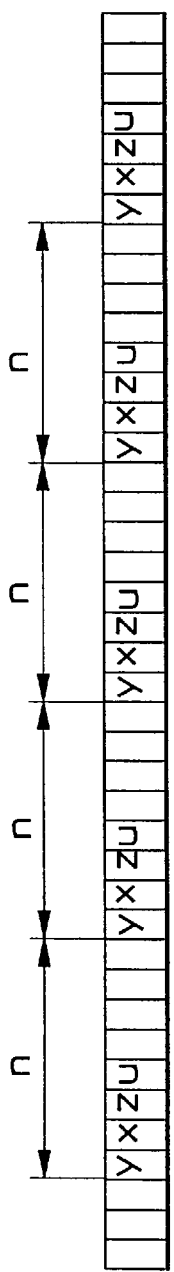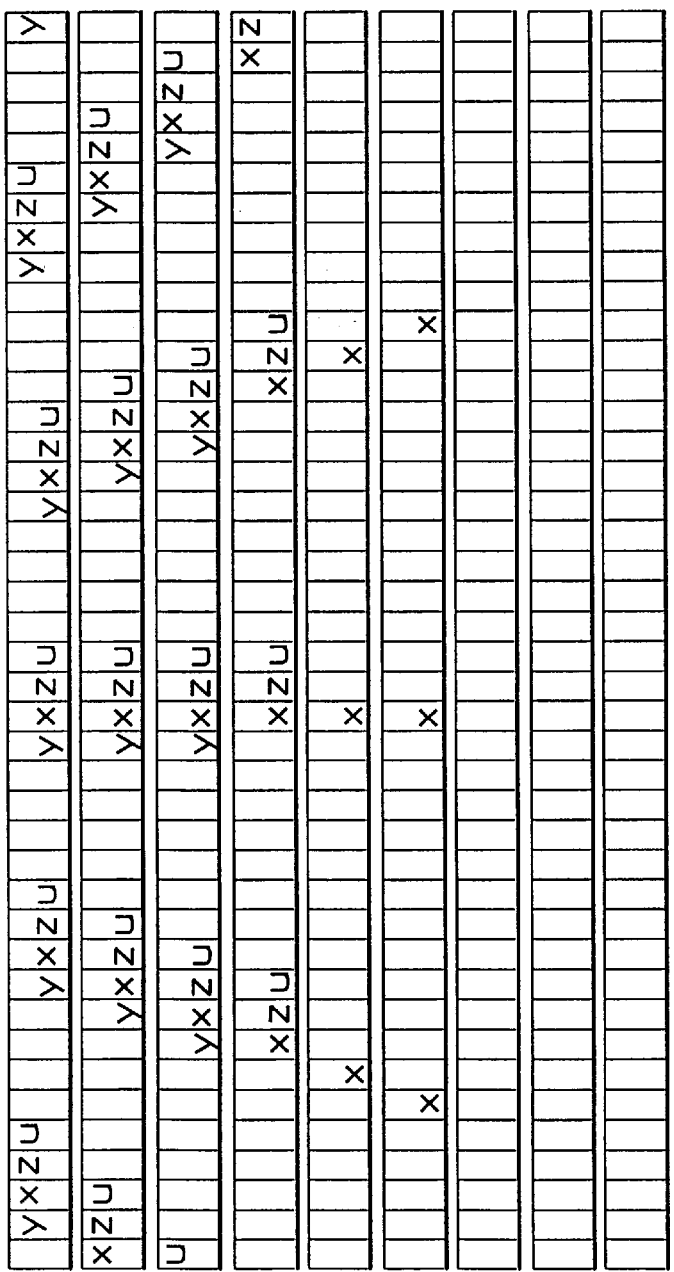

METHOD FOR REDUCING FALSE TARGET ECHO INDICATIONS

This application claims priority under 35 U.S.C. §§119 and/or 365 to 9800847-7 filed in Sweden on Mar. 16, 1998; the entire content of which is hereby incorporated by reference.

TECHNICAL FIELD

The present invention relates to a method for reducing the number of false target echoes in detection in a pulse Doppler radar.

BACKGROUND

A radar which is to be used to distinguish moving targets from fixed targets, such as, for example, objects on the ground, is often designed as a so-called pulse Doppler radar. This type of radar transmits radar pulses with a certain time interval between the pulses, the so-called pulse repetition interval, PRI. This interval can also, of course, be expressed as corresponding frequency, the so-called pulse repetition frequency, PRF.

Where a pulse Doppler radar is used on mobile platforms which are able to move at high speeds, it is often necessary to choose such a high PRF that an unambiguous range to the detected target cannot be obtained. PRF's which are so high that an unambiguous range cannot be obtained are often called MPD or HPD (Medium/High Pulse Doppler).

One of the difficulties of obtaining an unambiguous target range in the use of MPD or HPD is due to the fact that detected targets give rise to a plurality of detections, so-called primary detections, during the period in which the targets are illuminated by the so-called main beam of the radar antenna, a period which is also known as the dwell time. These primary detections will appear in many of the range resolution elements of the radar, the so-called range gates. In order to obtain the correct target range, it is necessary, in other words, to know which of the range gates in which the detection is found that corresponds to the actual range of the target from the radar.

A conventional method for obtaining an unambiguous target range in the use of MPD or HPD is to use more than one PRF during the period in which a target is illuminated by the main beam of the radar. In order to obtain an unambiguous target range from a detection, the information from the range gates of the various PRF's is compiled and compared with set criteria. These criteria are often of the M/N type, in which N can be the total number of PRF's used, and M is an integer less than and distinct from N.

A drawback with known methods for the use of criteria of the M/N type is that so-called "false targets" or "range ghosts" may be obtained, in other words indications of targets which are not there. These range ghosts are most often due to a mix of primary detections from a plurality of targets which are perceived by the radar, on account of the methods used, as belonging to one and the same target.

U.S. Pat. No. 4,584,579 sets out a method for reducing the number of range ghosts in a pulse Doppler radar. In brief, the method can be said to constitute an iterative process employing two different, non-variable criteria. According to the process, knowledge of detection history is also used, as well as separate processes for removing different types of false targets. A drawback of this method can thus be said to be that is calls for relatively highly complex equipment. Furthermore, the method does not reduce the volume of range ghosts to the extent which is desirable.

SUMMARY

The problem which is solved by the present invention is thus to reduce the amount of range ghosts, in other words false target echo indications, in detections in a pulse Doppler radar. The invention is primarily intended for use in pulse Doppler radars with PRF's with HPD or MPD, and which employ a plurality, at least two, different pulse repetition frequencies, PRF's, during the period in which the main beam of the radar illuminates a target.

The problem is solved by means of a method comprising use of at least one variable criterion and a final criterion, of the M/N type, in other words M corresponding primary detections in N range gates.

According to the invention, the factor M in the variable criterion is initially greater than the corresponding factor M in the final criterion. Primary detections which are all to be found in the same range gate in a number of PRF's, which number is equal to the factor M in the variable criterion, are approved as targets in this range gate in the method according to the invention.

The primary detections which have thus been approved, and all primary detections corresponding thereto, are thereafter removed from further processing, and the factor M in the variable criterion is reduced by a predetermined number, suitably the number one.

The method is thereafter repeated, the primary detections which are all to be found in the same range gate in the now reduced number M of PRF's are approved as targets and removed from the processing, together with all primary detections corresponding to them. This process is repeated until the factor M in the variable criterion has been reduced such that it corresponds to the factor M in the other criterion.

The number N in the variable criterion is suitably equal to the total number of PRF's used during the period in which the main beam of the radar illuminates the target, and the predetermined number which is subtracted from the factor M in the variable criterion is preferably equal to one.

Simulations of a given case have shown that using a method according to the invention, given the presence of 10 targets, the mean value of correctly resolved targets in 1000 cases amounts to 9.97 and the mean value of range ghosts amounts to only 0.05.

DESCRIPTION OF THE DRAWINGS

The invention will be described below with reference to an example of an embodiment and with the aid of the appended drawings, in which:

FIGS. 5–9 show in an alterative manner a method according to the invention.

DETAILED DESCRIPTION

In order to facilitate understanding of the invention, the principle for detection where more than one PRF is used will initially be briefly described with reference to FIGS. 1 and 2.

Figure 1:
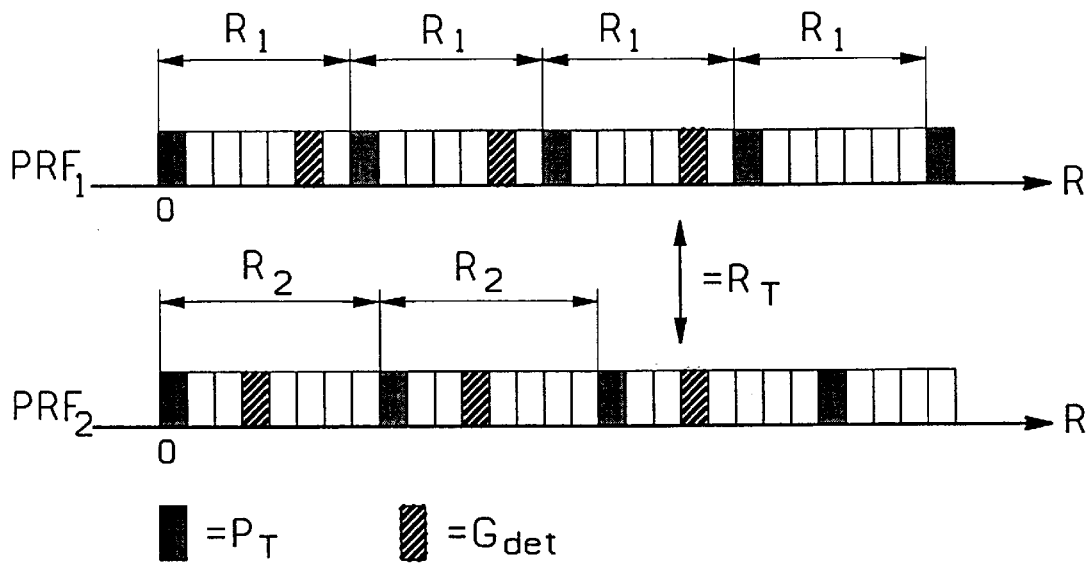
FIG. 1 shows the detection principle where more than one PRF is used.

In the example used in FIG. 1, two PRF's, $PRF_1$ and $PRF_2$, are used. The two PRF's each correspond to one respective ambiguous range, $R_1$ and $R_2$, which ranges correspond in turn to the distance which a radar pulse covers during the period which elapses before the next pulse in the respective PRF is sent. The said distances, which the radar pulses cover, are calculated from a common reference point, labelled "0" in FIGS. 1–4. This common reference point is suitably the position of the radar.

The pulses transmitted in the respective PRF are shown in shaded representation, and are denoted by $P_T$. As is evident from FIG. 1, the same target has been detected in both $PRF_1$ and $PRF_2$. This target appears in different range gates in the different PRF's, which range gates have been given the notation $G_{det}$.

As has been mentioned above, the problem where a number of PRF's are used is to determine which of the range gates $G_{det}$ that corresponds to the actual range of the detected target from the radar. A simple way of determining the actual range of a target is to assume that if one and the same range gate in both the PRF's contains a detection, then the detected target is at the range to which this common gate corresponds. This is shown in FIG. 1 by a dual-direction arrow, which has been given the notation $R_T$. By the term "same range gate" is mean here and hereinafter two or more range gates which are mutually equidistant from a common reference point, for example the point denoted by "0" in FIGS. 1–4.

Figure 2:
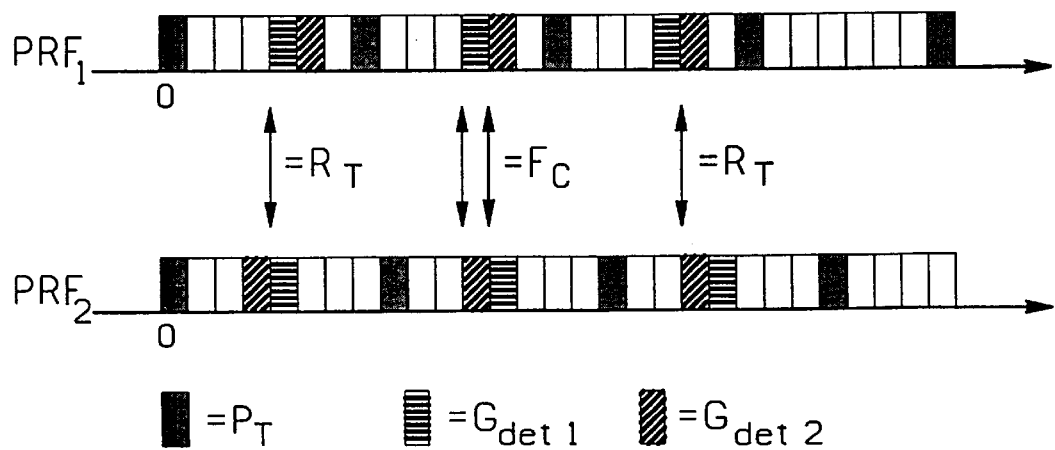
FIG. 2 shows how false target echo indications can arise in a method according to FIG. 1.

FIG. 2 shows how false target echo indications can arise in a method according to FIG. 1 when two targets are detected. In the example shown in FIG. 2, the same two targets have been detected in $PRF_1$ and $PRF_2$. The range gates in the respective PRF which contain the detected targets have in FIG. 2 been given the notations $G_{det1}$ and $G_{det2}$. As is further evident from FIG. 2, the principle depicted with reference to FIG. 1 will not work in this case, "range ghosts" will appear in respect of a number of range gates. The range ghosts have in FIG. 2 been given the notation $F_c$.

Figure 3:
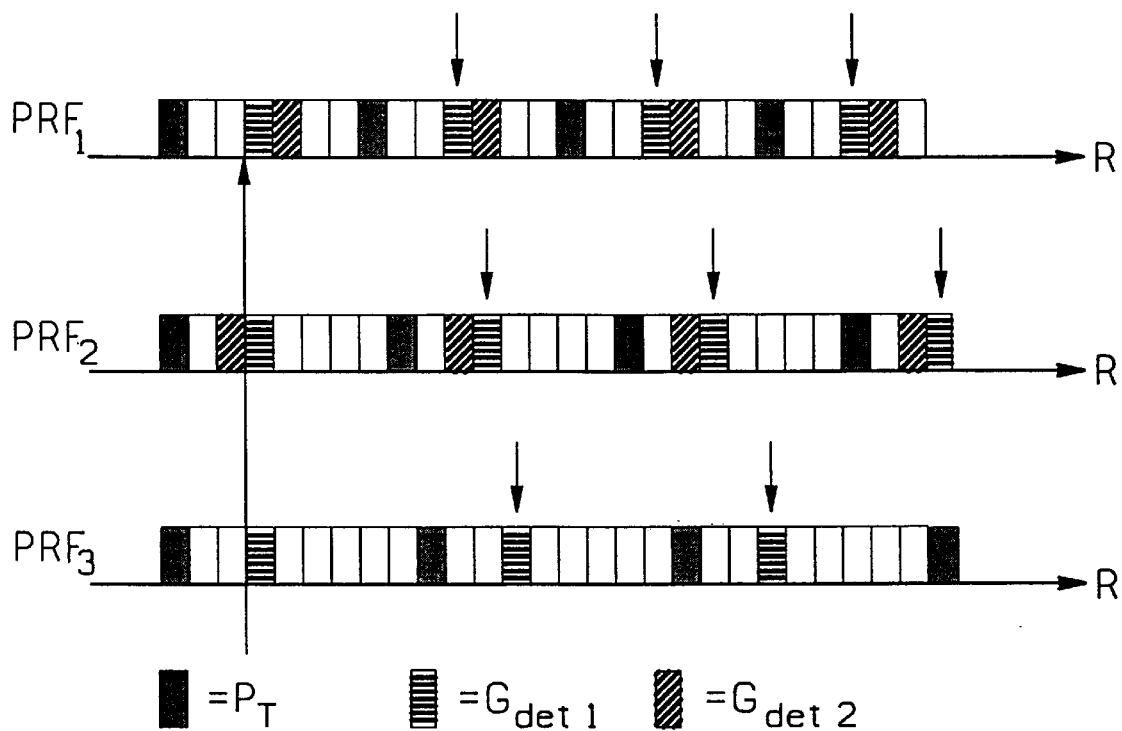
FIG. 3 shows the initial step in a method according to the invention.

In FIG. 3, an example is shown of an initial state of a method according to the invention. In the example three PRF's are used, $PRF_2$, $PRF_2$ and $PRF_3$. The pulses which are transmitted in the respective PRF are shown with a shaded symbol, labelled $P_T$. As is further evident from FIG. 3, the same two targets have been detected in two of the PRF's. In the third PRF, only one target has been detected. The detected targets have given rise to primary detections which partly appear in different range gates in the respective PRF. Those range gates in the respective PRF which contain primary detections corresponding to the two targets have been given the respective notations $G_{det1}$ and $G_{det2}$.

As has been mentioned above, according to the invention at least two detection criteria are used, a variable criterion and a final criterion, both of which are of the M/N type, in other words M corresponding primary detections in N PRF's. In the example depicted in FIGS. 3 and 4, the factor M in the variable criterion is initially equal to three, the factor M in the final criterion is equal to two, and the factor N has been set at three in both the criteria. In other words, the variable criterion can initially be written as 3/3, and the final criterion can be written as 2/3. It is not essential for the factor N to be given a value corresponding to the total number of PRF's used, but this feature is adopted in a preferred embodiment of the invention.

In FIG. 3, the condition in the variable criterion 3/3 is met. In other words the presence of a primary detection in 3 range gates of the 3 used PRF's. This has been marked by a connecting arrow. According to the invention, the primary detection which met the variable criterion (3/3) will now be approved as a target in that range gate in which it met the variable criterion.

Furthermore, the approved primary detection, and all other primary detections corresponding to it, will be removed from further processing. The other primary detections which will be removed have been marked with smaller arrows in all three PRF's.

Figure 4:
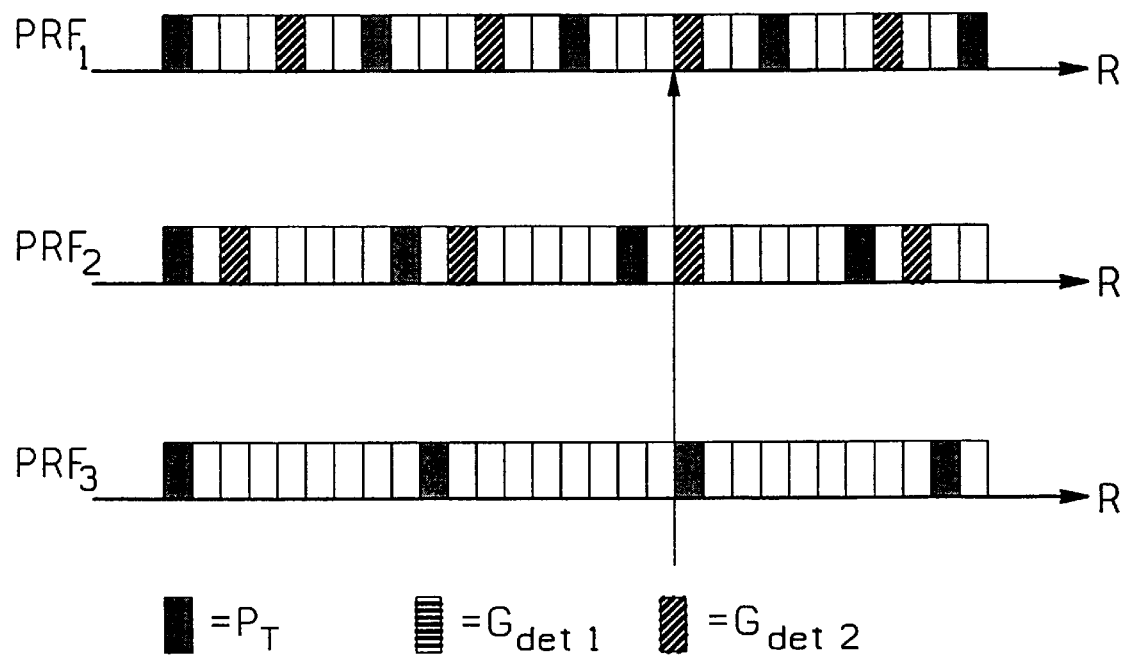
FIG. 4 shows the continued processing in a method according to the invention.

FIG. 4 illustrates the primary detections and PRF's following the removal of primary detections according to the principle described with reference to FIG. 3. According to the invention, the factor M in the variable criterion is now reduced by one and the variable criterion consequently becomes 2/3, in other words 2 corresponding primary detections in 3 PRF's.

One primary detection in FIG. 4 meets the criterion 2/3. This primary detection is shown by a connecting arrow, and is thus approved as a target.

Since the final criterion in the aforementioned example is 2/3, the final criterion and the variable criterion are now equal, and the process is consequently concluded.

For the sake of clarity, it can be added that the primary detection which in FIG. 4 meets the criterion 2/3 has not been detected in $PRF_3$, since a pulse ($P_T$) has been transmitted at the time when the primary detection would have been received, this being shown by a shaded range gate.

In a preferred embodiment, the method according to the invention is conducted with the aid of matrix calculations. This will be depicted below with reference to FIGS. 5 to 9 inclusive.

Assume that nine different PRF's are used successively during the period in which the main beam of the radar illuminates the target. For each pulse frequency there are a certain number, n, of range gates between each transmitted pulse. The length of the range gates is the same in all PRF's. For each PRF there is further a certain ambiguous range, R, which is determined by the period between the transmitted pulses in the PRF.

Express this as:

$$R_i = n_i * L \qquad (1)$$

where i is the number of the PRF, n is the number of range gates between the pulses transmitted in the PRF, in other words the unambiguity range of the PRF, and L is the length of the range gates, in the present case, therefore, $1 \leq i \leq 9$.

Consider the case in which the first PRF has been used (i=1) and assume that a target has been detected in a range gate which is given the notation k. An unambiguous target range cannot be directly determined, but the possible target ranges $R_6$ can be expressed as:

$$R_6 = k + s * n \qquad (2)$$

where s is a positive integer.

In a calculation according to the invention, the possible target positions which are obtained by (2) are placed in a row vector, in which the elements in the vector correspond to range gates.

The use of matrices in calculations according to the invention will be illustrated below by means of an example in which four targets are detected, which targets are named x, y, z and u, and a total of nine PRF's are used.

The possible target ranges for, for example, target y can be expressed as:

$$R_6(y) = y_1 + s \cdot n_y \quad (3)$$

where $n_y$ is the unambiguity range for the used PRF and $y_1$ is the number of the first gate in the used PRF in which the target y has been detected.

In FIG. 5 the row vector which is obtained is shown, with the possible target positions for the targets x, y, z and u. For each PRF, a vector is therefore obtained of the type shown in FIG. 5.

This process is conducted for all the used PRF's. In the present case, nine row vectors are therefore obtained, which, taken together, can be viewed as a matrix. The number of rows in this matrix corresponds to the number of used PRF's and the number of columns corresponds to the field of measurement of the radar in range, expressed in number of range gates. This matrix is shown in FIG. 6. The matrix shown in FIG. 6 can obviously also be regarded as a suitable detail from a larger matrix, in other words a matrix with nine PRF's, but having more range gates.

For the sake of clarity, the transmission pulses $P_T$ and the common reference point for the pulses have been omitted in FIG. 6 and hereinafter.

In the calculations according to the invention, in those elements which correspond to possible target positions (range gates) there is stored a certain predetermined figure or symbol, suitably the figure one. Other elements are given a different predetermined figure or symbol, suitably the figure zero.

Figures 7, 8, 9:
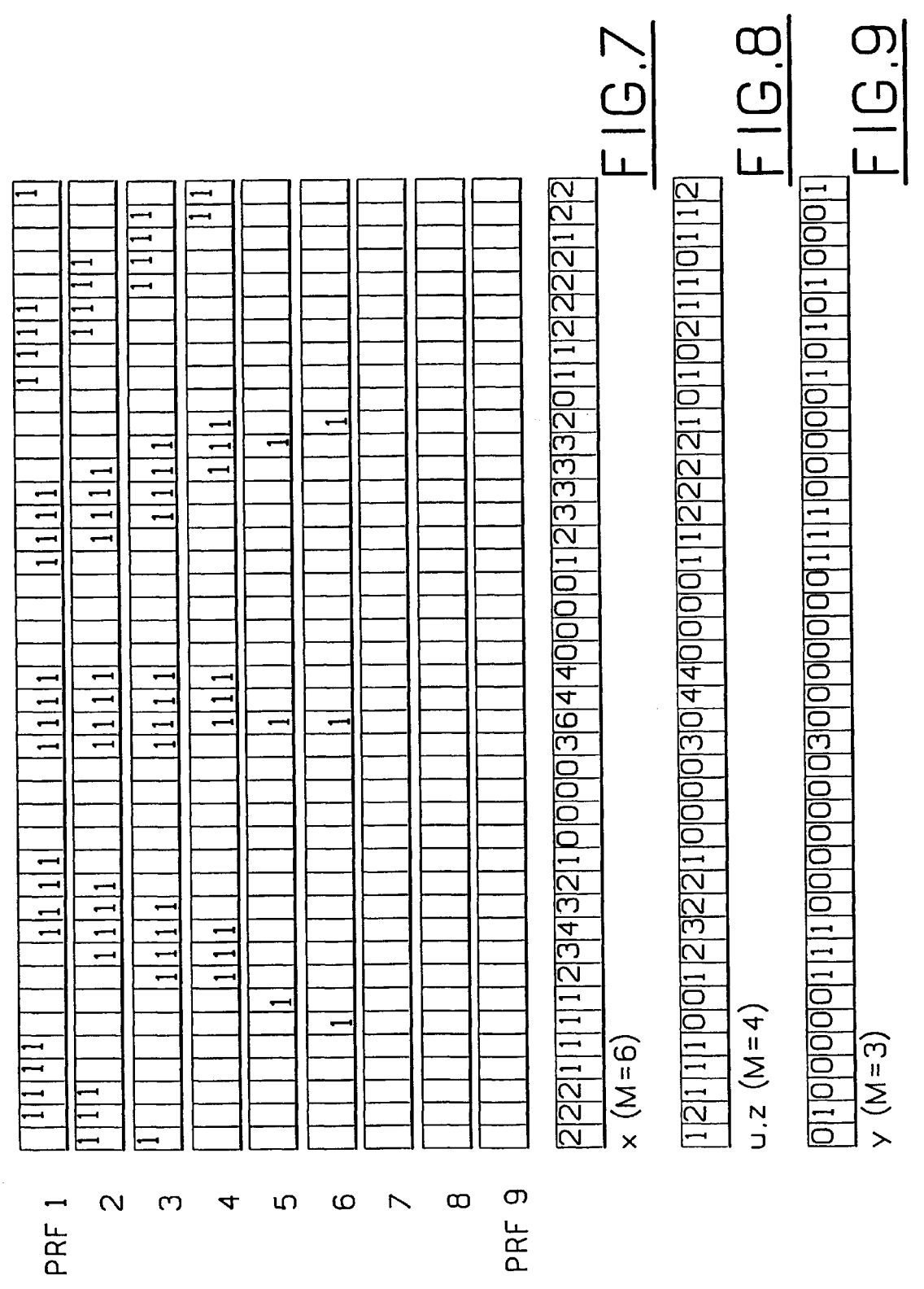

In the upper part of FIG. 7 is shown the matrix from FIG. 6, now with the figure one in all possible target positions. Once this matrix has been compiled, a summation of the same elements in each PRF is made. Base on this summation, a resultant row vector, shown in the lower part of FIG. 7, is obtained.

Each element in the resultant row vector can in other words contain a numerical value between zero and nine.

In the example shown with reference to FIGS. 5 and 6, the variable criterion is 9/9 and the second criterion 3/9. All primary detections meeting the criterion 9/9 will therefore first be identified. Primary detections meeting this criterion will correspond to positions in the row vector with the constant 9. Thus, all positions in the resultant row vector which have the content 9 are identified and approved as targets, after which the primary detections which are found in these positions in the columns within the matrix, and all primary detections corresponding thereto, are eliminated from the matrix. Thereafter the process is repeated, now with the factor M, the numerator in the variable criterion, reduced to 8, and so forth, until the factor M, the numerator in the variable criterion, is equal to the numerator in the final criterion.

As is evident from the row vector which is shown at the bottom in FIG. 7, the highest numerical value which is to be found in any range gate in the row vector is the number 6, which is found in positions in which the target x has been detected. The first occasion on which the variable criterion is met is, in other words, when its value is 6/9.

As previously described, the primary detections in that range gate in which the number 6 was found are now approved as targets, and primary detections in that gate are removed from the matrix, which is also effected with all other primary detections corresponding to that which has been approved. This means that the matrix acquires a somewhat different content. For the sake of clarity, however, only the resultant row vector of the new matrix will be shown, namely in FIG. 8.

Following the removal of primary detections according to the above, the row vector in FIG. 8 is now examined according to the new variable criterion, 5/9. It is evident from FIG. 8 that no range gate has the numerical value 5, so the numerator in the variable criterion is once again reduced, and the variable criterion thus becomes 4/9. As can be seen in FIG. 8, this criterion is met by primary detections in two range gates, which primary detections are thus approved as targets in the respective range gate. By way of elucidation, it can be stated that these targets are the targets named u and z in FIGS. 5 and 6.

The matrix is updated again, and summated to produce the row vector shown in FIG. 9. It can be seen from FIG. 9 that the variable criterion will only be met once its numerator has been reduced such that the criterion becomes 3/9, in which instance a target can be identified. This target is that which was named z in FIGS. 5 and 6 above. Since the final criterion in the example is 3/9, the process will now cease, since the numerator, the factor M, in the variable criterion is now equal to the numerator, the factor M, in the final criterion.

As stated in the introduction, simulations of a given case have shown that, using a method according to the invention, given the presence of 10 targets, the mean value of correctly resolved targets in 1000 cases amounts to 9.97 and the mean value of range ghosts amounts to only 0.05.

A description has been given above of a method involving different PRF's for tackling range resolution in the use of HPD or MPD. An alternative but similar method is to employ so-called main PRF3 s. Each main PRF is "centre PRF" for a number of mutually adjacent so-called sub-PRF's. The method according to the invention, when main PRF's are used, proceeds as follows: Assume that n main PRF's are used. First, primary detections are determined according to the criterion $n_2/n$, in other words that $n_2$ main PRF's have given targets at the same range. The primary detections which have contributed to meeting this criterion are removed from the continued processing, something which is also done for all primary detections corresponding to the primary detections which have contributed in this way.

Based on the remaining primary detections, a new target detection attempt is now made, this time according to the criterion $(n_2-1)/n$. This is repeated in the same way as in the previously described processes, until a predetermined starting criterion, for example $1/n$, has been attained.

The invention is not limited to the above specified illustrative embodiment, but can be freely varied within the scope of the subsequent patent claims. For example, the values of the factors M and N can be varied in an essentially arbitrary manner within the scope of the invention. Furthermore, the factor M in the variable criterion does not need to be reduced by the number one at each stage of the process, the reduction an also be made by other numbers.

Furthermore, a method has been depicted above in which the numerator, N, in the variable criterion forms the basis for examining the number of primary detections present in the same range gate. Of course, an alternative embodiment might be imagined in which one instead quite simply examines what is the largest incidence of primary detections in the same range gate, after which a "countdown" is carried out according to what has been described above.

What is claimed is:

1. A method for reducing false target echo indications ($F_c$) in detections in a pulse Doppler radar, which radar employs at least two different pulse repetition frequencies ($PRF_1$, $PRF_2$) during the period in which the main beam of the radar illuminates a target, and which radar has a number of range gates which are supplied with a signal representing a primary detected target in each PRF in which the target has been detected, which method comprises the use of at least one variable criterion and a final criterion, which criteria are both of the M/N type, comprising the following steps:

a approving primary detections which are all to be found in the same range gate in a number, M, of PRF's, which number is equal to the factor M in the variable criterion;

b removing the approved primary detections and all other corresponding primary detections from further processing;

c subtracting a predetermined number from the number M in the variable criterion; and d repeating steps (a) through (c) until the number M reaches a predetermined lower threshold.

2. A method according to claim 1, wherein N in the variable criterion is equal to a number of PRF's used during a period in which the main beam of the radar illuminates a target.

3. A method according to claim 1, wherein the predetermined number which is subtracted from the factor M in the variable criterion is equal to one.

4. A method according to claim 1, wherein when the method is initiated, N is equal to the factor M in the variable criterion.

5. A method of reducing false target echo indications in a pulse doppler radar using N different pulse repetition frequencies, where N is at least two, wherein the radar implements a data structure representing a number of range gates in the form of resolution elements in range, comprising the steps of:

(a) in each data structure corresponding to one of the N pulse rate frequencies, generating a positive range gate signal in a data element corresponding to a range gate in which a target is detected;

(b) comparing the number of positive range gate signals representative of a detected target to an initial confidence criterion M, where M is less than or equal to N;

(c) approving targets for which the number of positive range gate signals is greater than or equal to M;

(d) removing from the data structure positive gate range signals corresponding to approved targets;

(e) reducing the confidence level M by a predetermined amount; and (f) repeating steps (c) through (e) until M reaches a lower confidence threshold.

6. A method according to claim 5, wherein:

the radar implements a data structure corresponding to an array gate range signals for each of the N pulse rate frequencies implemented.

7. A method according to claim 5, wherein:

the positive range signal corresponds to a binary 1.

8. A method according to claim 5, wherein the step of comparing the number of positive range gate signals representative of a detected target to an initial confidence criterion M comprises:

adding the positive range gate signals in the corresponding range gates to obtain a sum thereof; and comparing the sum to the confidence criterion.

* * * * *